(12) United States Patent
Yao et al.

(10) Patent No.: US 7,554,772 B2
(45) Date of Patent: Jun. 30, 2009

(54) HEAD GIMBAL ASSEMBLY HAVING AN INDEPENDENT SPACER THEREIN AND DISK DRIVE UNIT WITH THE SAME

(75) Inventors: MingGao Yao, DongGuan (CN); Masashi Shiraishi, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 369 days.

(21) Appl. No.: 11/409,071

(22) Filed: Apr. 24, 2006

(65) Prior Publication Data

US 2007/0247762 A1 Oct. 25, 2007

(51) Int. Cl.
G11B 5/596 (2006.01)
G11B 21/24 (2006.01)

(52) U.S. Cl. .................... 360/294.3; 360/294.4

(58) Field of Classification Search .......... 360/294.3, 360/294.4, 245.3, 245.4
See application file for complete search history.

(56) References Cited

U.S. PATENT DOCUMENTS

| | | | |
|---|---|---|---|
| 6,381,104 B1 * | 4/2002 | Soeno et al. ............. | 360/294.4 |
| 6,618,220 B2 * | 9/2003 | Inagaki et al. ............. | 360/78.05 |
| 6,671,131 B2 | 12/2003 | Kasajima et al. | |
| 6,700,749 B2 | 3/2004 | Shiraishi et al. | |
| 6,747,848 B2 * | 6/2004 | Kasajima et al. ......... | 360/245.3 |
| 2006/0072247 A1 * | 4/2006 | Yao et al. ................. | 360/294.4 |

FOREIGN PATENT DOCUMENTS

| | | |
|---|---|---|
| JP | 2002-74871 | 3/2002 |
| JP | 2002-133803 | 5/2002 |

* cited by examiner

*Primary Examiner*—Jefferson Evans
(74) *Attorney, Agent, or Firm*—Nixon & Vanderhye, P.C.

(57) ABSTRACT

A HGA of the invention includes a micro-actuator, a slider and a suspension to support the micro-actuator and the slider. The suspension comprises a flexure for mounting the micro-actuator thereon, a suspension tongue connected to the flexure and an independent spacer sandwiched between the suspension tongue and the flexure to form a parallel gap between the suspension tongue and the micro-actuator. Also disclosed is a disk drive unit having the HGA.

12 Claims, 9 Drawing Sheets

HEAD GIMBAL ASSEMBLY HAVING AN INDEPENDENT SPACER THEREIN AND DISK DRIVE UNIT WITH THE SAME

FIELD OF THE INVENTION

The present invention relates to information recording disk drive units and, more particularly to a head gimbal assembly (HGA) used in a disk drive unit.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using conventional technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator, which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "HGA Equipped with Actuator for Fine Tuning, Disk Drive Equipped with the HGA, and Manufacturing Method of the HGA." Other exemplary PZT micro-actuators are also disclosed in, for example, U.S. Pat. Nos. 6,671,131 and 6,700,749.

Figure 1A:
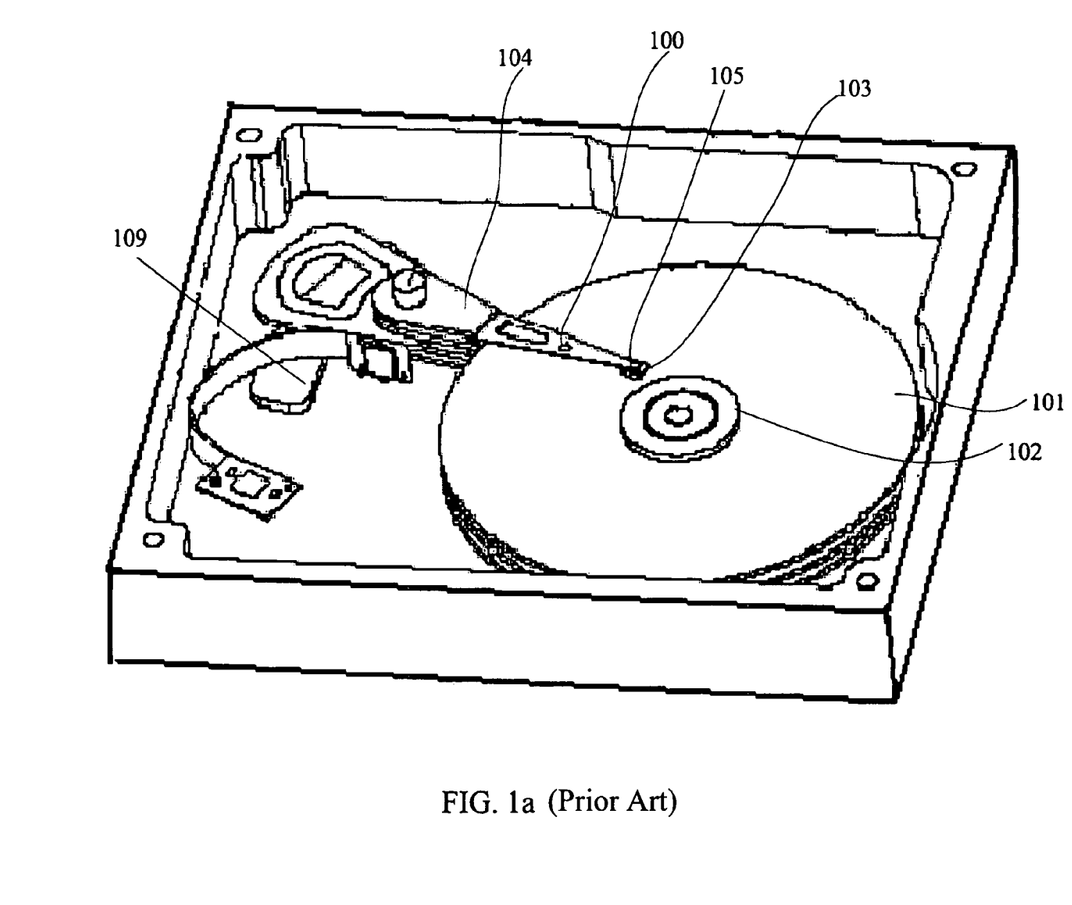
FIG. 1a is a perspective view of a conventional disk drive unit.
Figure 1B:
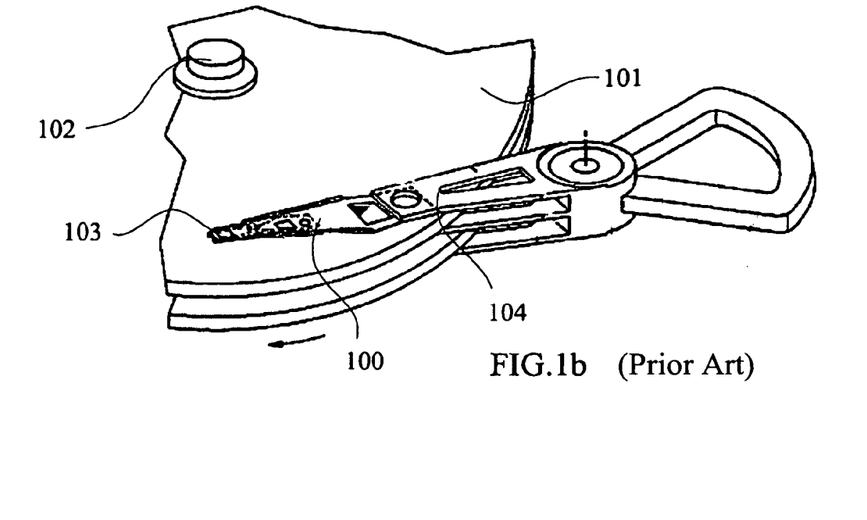

FIGS. 1a-1b illustrate a conventional disk drive unit and show a magnetic disk 101 mounted on a spindle motor 102 for spinning the disk 101. A voice coil motor arm 104 carries a HGA 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 2 illustrates the HGA 100 of the conventional disk drive device of FIGS. 1a-1b. The HGA 100 comprises a micro-actuator 105, a slider 103 disposed in the micro-actuator 105 and a suspension 113 to support the micro-actuator 105 and slider 103. The suspension 113 is manufactured by assembling a base plate 114, a hinge 115, a load beam 116 and a flexure 117. However, because of the inherent tolerances of the VCM and the head suspension assembly, the slider 103 cannot achieve quick and fine position control, which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

Figure 2A:
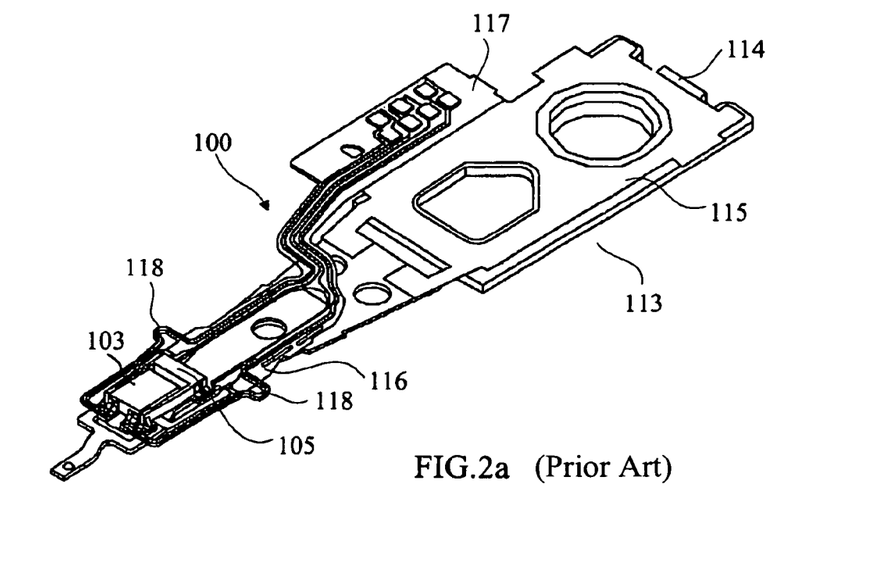
FIG. 2a is a perspective view of a conventional HGA.
Figure 2B:
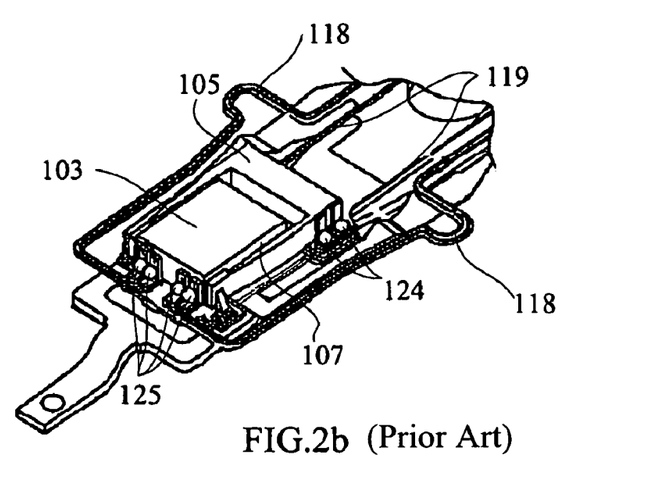
Figure 2C:
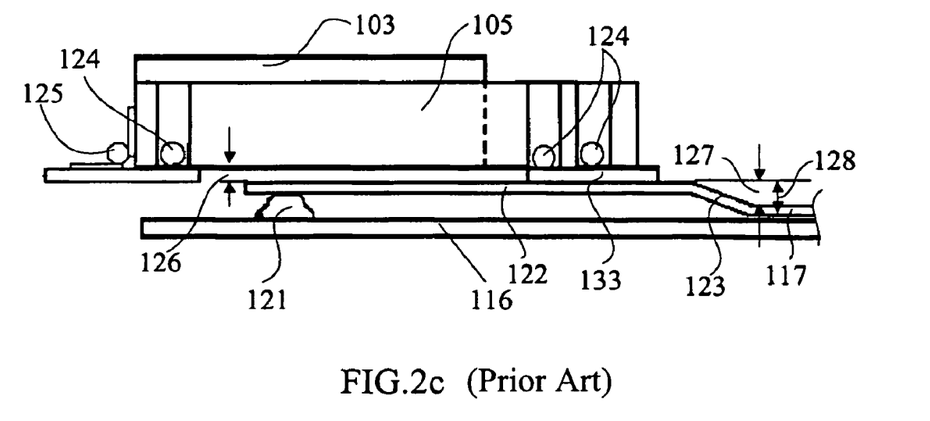
FIG. 2c is a partial, side view of the HGA shown in FIG. 2b.

Referring to FIGS. 2a-2c, a conventional PZT micro-actuator 105 includes a ceramic U-shaped frame, which has two ceramic beams or side arms 107 each having a PZT element thereon. The ceramic beams 107 hold the slider 103 therebetween and displace the slider 103 by movement of the ceramic beams 107. The PZT micro-actuator 105 is physically coupled to a suspension tongue 122 of the suspension 113 (refer to FIG. 2c). Three electrical connection balls 124 (gold ball bonding or solder ball bonding, GBB or SBB) are provided to couple the micro-actuator 105 to the inner suspension traces 119 located at the side of each of the ceramic beams 107. In addition, there are four metal balls 125 (GBB or SBB) for coupling the slider 103 to the outer suspension traces 118.

Referring to FIG. 2c, the suspension tongue 122 is formed at one end of the flexure 117 and a step portion 123 is formed between the suspension tongue 122 and the flexure 117. The suspension tongue 122 has a micro-actuator mounting area 133 on which the micro-actuator is mounted by epoxy or ACF (anisotropic conductive film). The load beam 116 of the suspension 113 has a dimple 121 formed thereon that engages with the suspension tongue 122. The dimple 121 and the step portion 123 of the flexure 117 support the suspension tongue 122 cooperatively. The micro-actuator mounting area 133 of the suspension tongue 122 has layered structure that forms a step in conjunction with the epoxy or ACF. A parallel gap 126 is provided between the suspension tongue 122 and the micro-actuator 105 to allow the micro-actuator 105 to smoothly displace the slider 103 when a voltage is input to the PZT elements of the micro-actuator 105. The gap 126 can assure a free movement of the slider 103 and the micro-actuator 105, which is very important for HGA performance.

Figure 2D:
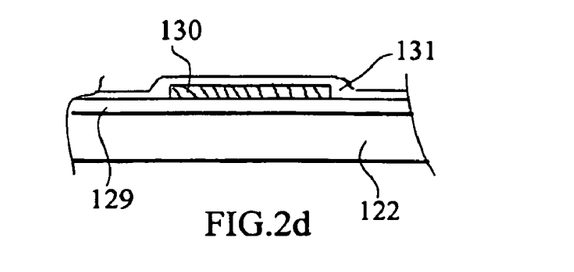
FIG. 2d is an enlarged, structural view of the HGA of FIG. 2c in micro-actuator mounting area.

It is proved by experiments that the micro-actuator and the slider can obtain a good work performance, such as dynamic and static performance when the parallel gap 126 has a distance ranges between 35 μm and 50 μm. Hence, keeping the parallel gap 126 with a height of 35-50 μm has critical effect to performance improvement of the micro-actuator and slider. However, conventional HGA cannot form such a step with a height ranging between 35 μm and 50 μm. More specifically, as shown in FIG. 2d, the micro-actuator mounting area 133 of the suspension tongue 122 has a laminated structure made of a polyimide base layer 129 disposed on surface of the suspension tongue 122, a conductive layer 130 disposed on the polyimide base layer 129 and a polyimide cover layer 131 that covers the conductive layer 130. The polyimide base layer 129 has a thickness of 10 μm, the conductive layer 130 has a thickness of 10 μm, while the polyimide cover layer 131 has a thickness of 3-5 μm, therefore, the layered structure has a total thickness of about 23-25 μm. When the micro-actuator is mounted on the layered structure of the mounting area by epoxy or ACF, since the epoxy or ACF has a maximal thickness of 5 μm, the parallel gap formed between the assembled micro-actuator and the suspension tongue ranges between 28 μm and 30 μm; in addition, effected by various tolerances existing in manufacturing process, the micro-actuator and the suspension tongue may not work properly because the gap formed therebetween is too small, thus influencing operation performance of the micro-actuator and the HGA.

Moreover, as illustrated in FIG. 2c, the HGA need have suitable static attitude angle to avoid tilt of the micro-actuator and the HGA during HGA assembling process, thus not influencing operation performance of the micro-actuator and the HGA. Since the dimple 121 of the load beam 116 of the suspension 113 supports the top end of the suspension tongue 122, conventionally, a step 128 (may be formed such as by machining a sheet of material using stamping process and then bending it slantways) is formed between the other end of the suspension tongue 122 and welding point of the flexure 117 by suitable manner. The step 128 and the dimple 121 of the load beam 116 support the suspension tongue 122 together. However, due to certain manufacture precision limitation, along with very small dimension (a step height of not more than 50 μm) of the part to be machined (the step), this conventional structure design, i.e., integral structure of the flexure and the suspension tongue by forming an inclined step using bending process, brings difficulty of machining, thereby increasing manufacture cost.

Thus, there is a need for an improved HGA and disk drive unit that does not suffer from the above-mentioned drawbacks.

SUMMARY OF THE INVENTION

One aspect of the present invention is to provide a HGA and a disk drive unit capable of forming a proper gap between the suspension tongue and the micro-actuator, thus enabling the micro-actuator moving more smoothly, and improving operation performance of the micro-actuator and the disk drive unit.

Another aspect of the present invention is to provide a HGA and a disk drive unit having a structure that can be formed easily, thus effectively reducing manufacturing and assembly cost of the HGA.

To achieve the above objects, the invention provides a HGA which comprising a micro-actuator, a slider and a suspension to support the micro-actuator and the slider. The suspension comprises a flexure for mounting the micro-actuator thereon, a suspension tongue connected to the flexure and an independent spacer sandwiched between the suspension tongue and the flexure to form a parallel gap between the suspension tongue and the micro-actuator.

In an embodiment of the invention, the independent spacer is an independent spacer block and is made of stiff material.

In another embodiment of the invention, the parallel gap has a distance ranging between 35 μm and 50 μm.

In a further embodiment of the invention, the independent spacer is disposed between the suspension tongue and the flexure by welding. In another embodiment of the invention, the independent spacer is disposed between the suspension tongue and the flexure by adhesive.

In an embodiment of the invention, the flexure has two side bars and a micro-actuator mounting plate connected to the side bars, and the independent spacer is disposed between the micro-actuator mounting plate and the suspension tongue. The suspension tongue comprises a central portion and two outer triggers located at both sides of the central portion and connected to the central portion, and the two outer triggers are laminated on the two side bars of the flexure by welding or adhesive.

The invention provides a disk drive unit, which comprises a HGA consisting of a micro-actuator, a slider and a suspension to support the micro-actuator and the slider; a drive arm connected to the HGA; a disk; and a spindle motor to rotate the disk. The suspension comprises a flexure for mounting the micro-actuator thereon; a suspension tongue connected to the flexure; and an independent spacer disposed between the suspension tongue and the flexure to form a parallel gap between the suspension tongue and the micro-actuator.

In the present invention, a bigger gap is formed between the suspension tongue and the micro-actuator by providing an independent spacer sandwiched between the suspension tongue and the flexure, thus enabling the micro-actuator and the slider moving more freely, avoiding interference with each other, and greatly improving dynamic and static performance of the disk drive unit. In addition, due to existence of the independent spacer, the HGA of the invention has no need to form a step between the suspension tongue and the flexure for increasing a distance between the flexure and the micro-actuator and then obtaining a suitable gimbal height. Consequently, a manufacturing process of the HGA becomes relatively simple and a manufacture cost thereof is reduced effectively.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a partial, perspective view of the conventional disk drive unit shown in FIG. 1a;

FIG. 2b is an enlarged, partial perspective view of the HGA shown in FIG. 2a;

FIG. 4b is an enlarged, partial perspective view of the HGA shown in FIG. 4a;

FIG. 4c is an enlarged, partial, side view of the HGA shown in FIG. 4a;

DETAILED DESCRIPTION OF ILLUSTRATED EMBODIMENTS

Various preferred embodiments of the instant invention will now be described with reference to the figures, wherein like reference numerals designate similar parts throughout the various views. The invention provides a HGA having an independent spacer, which comprising a micro-actuator, a slider and a suspension to support the micro-actuator and the slider. The suspension includes a flexure for mounting the micro-actuator thereon, a suspension tongue connected with the flexure, and an independent spacer. By sandwiching the independent spacer between the suspension tongue and the flexure, a predetermined parallel gap is formed between the suspension tongue and the micro-actuator, thus greatly improving performance of the micro-actuator and the disk drive unit. In addition, the HGA has a structure that the suspension tongue and the flexure are independent from each other so as to greatly reduce a manufacture cost thereof.

Several embodiments of a HGA of the invention will now be described. It is noted that the HGA may be implemented in any suitable disk drive device having a HGA, regardless of the specific structure of the disk drive device as illustrated in the figures. That is, the invention may be used in any suitable device having a HGA in any industry.

FIGS. 3a-4c illustrate a HGA 200 incorporating an independent spacer according to an exemplary embodiment of the present invention. Referring to FIG. 4a, the HGA 200 comprises a micro-actuator 205, a slider 203 and a suspension 213 to support the micro-actuator and slider 203. The slider 203 has a plurality of electrical connection pads 504 formed thereon. The micro-actuator 205 comprises a U-shaped support frame 790 that includes two side arms 343, 344 and a bottom arm 490. Two PZT elements 345, 346 are attached to the two side arms 343, 344 respectively. The PZT elements may be ceramic PZT elements, thin-film PZT elements, PMN-Pt elements or other suitable PZT elements, and may have a single-layer structure or a multi-layer structure. In addition, each of the PZT elements 345, 346 has a plurality of electrical connection pads 900 formed on one end thereof.

Figure 4A:
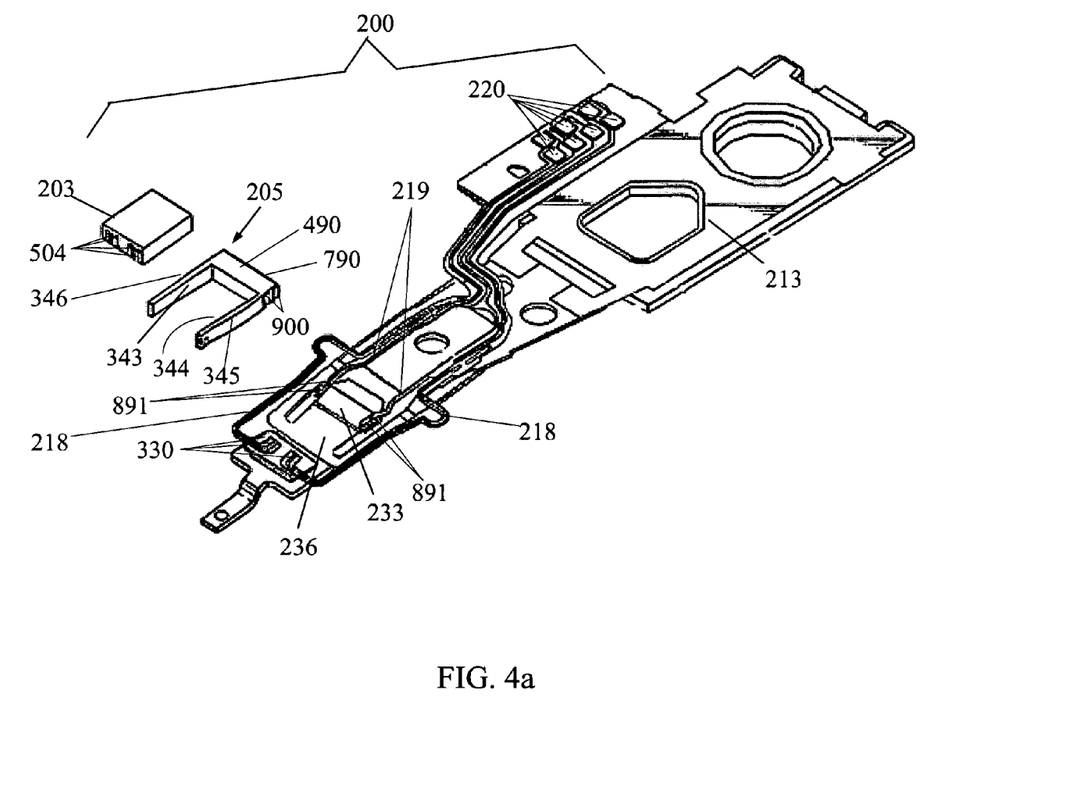
FIG. 4a is an exploded perspective view of a HGA according to an embodiment of the invention.
Figure 4B:
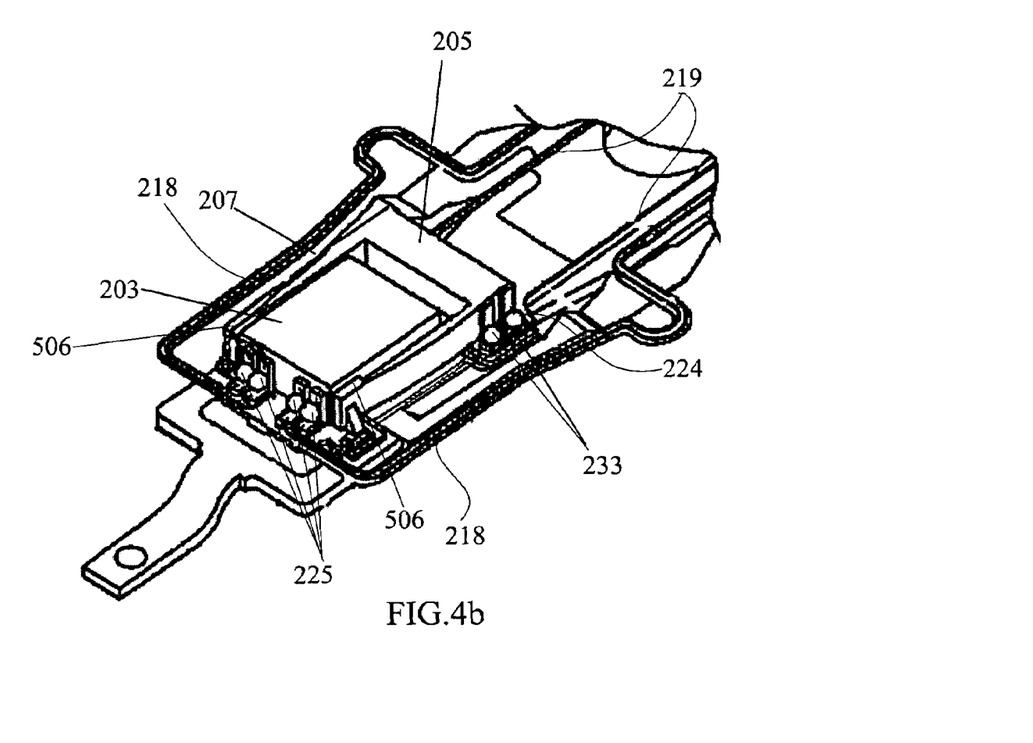

Referring to FIGS. 4a-4b, the slider 203 is partially mounted to two predetermined positions 506 of the two side arms 344, 343 of the micro-actuator 205 using adhesive, such as epoxy. The connection makes movement of the slider 203 dependent upon movement of the two side arms 344, 343 of the micro-actuator 205. By exciting the PZT elements 345, 346 mounted to the two side arms of the micro-actuator 205, the slider 203 can move controllably. The suspension 213 has a plurality of electrical connection pads 891 corresponding to the electrical connection pads 900 of the PZT elements 345, 346, and a plurality of electrical connection pads 330 corresponding to the electrical connection pads 504 of the slider 203.

Figure 3A:
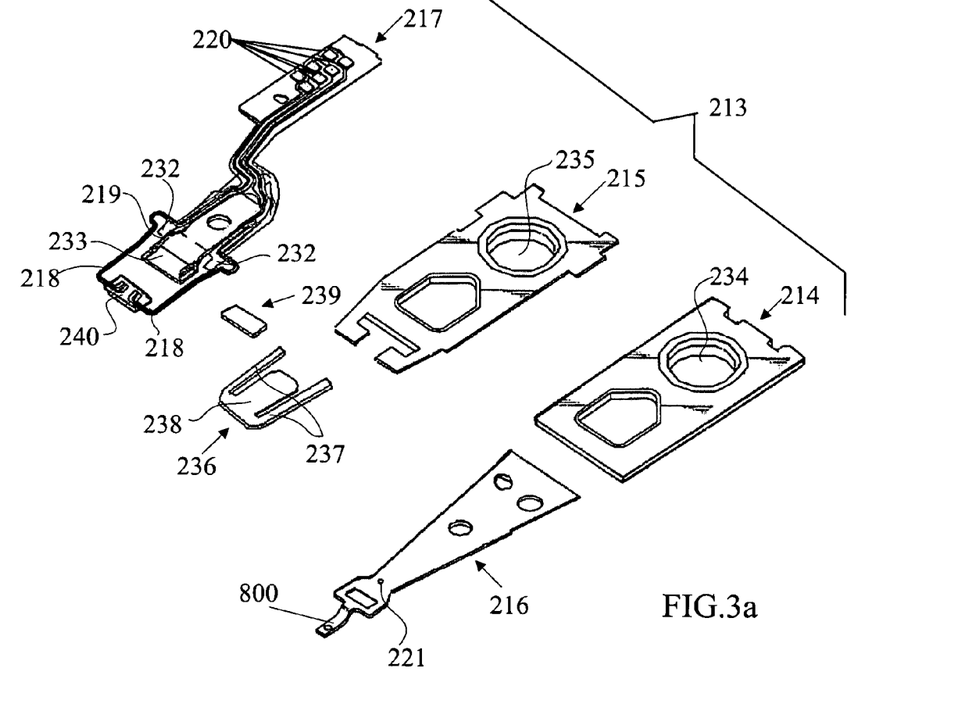
FIG. 3a is an exploded, perspective view of a suspension according to an embodiment of the invention.
Figure 3B:
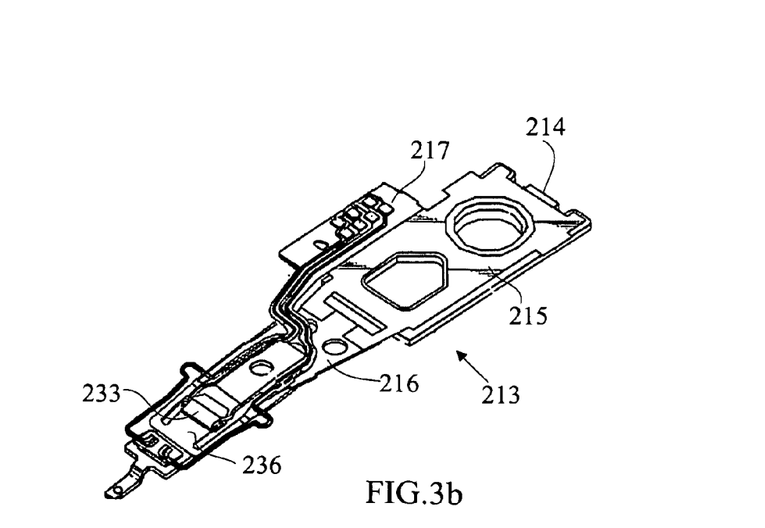
FIG. 3b is a perspective view of a suspension according to another embodiment of the invention.

FIG. 3a shows an exploded perspective view of a suspension 213 according to one embodiment of the invention; and FIG. 3b shows a perspective view of the suspension 213 of FIG. 3a after assembled. As illustrated, the suspension 213 includes a base plate 214, a load beam 216, a hinge 215, a flexure 217, an independent spacer 233 and a suspension tongue element 236, all of which are assembled together. The base plate 214 includes a mounting hole 234 for use in connecting the suspension 213 to a drive arm of a voice coil motor (VCM) of a disk drive device. The shape of the base plate 214 may vary depending on the configuration or model of the disk drive device. Also, the base plate 214 is constructed of a relatively hard or rigid material, e.g., metal, to stably support the suspension 213 on the drive arm of the VCM. The hinge 215 is mounted onto the base plate 214 and the load beam 216, e.g., by laser welding. As illustrated, the hinge 215 includes a hole 235 that aligns with the hole 234 in the base plate 214. Also, the hinge 215 includes a holder bar for supporting the load beam 216. The load beam 216 is mounted onto the holder bar of the hinge 215, e.g., by laser welding. The load beam 216 has a dimple 221 formed thereon. A lift tab 800 may be provided on the load beam 216 to lift the HGA 200 from the disk when the disk is not rotated. The flexure 217 is mounted to the hinge 215 and the load beam 216, e.g., by laser welding. The inner and outer suspension traces 219, 218 are provided on the flexure 217. Also referring to FIG. 4a, the suspension traces 219, 218 provided on the flexure 217 electrically connect a plurality of connection pads 220 (which connect to an external control system) with the slider 203 and the PZT micro-actuator 205.

More particularly, as shown in FIGS. 4a-4b, several electrical connection balls 224 (gold ball bonding or solder ball bonding, GBB or SBB), for example three are provided to couple the electrical connection pads 900 provided on the PZT elements 345, 346 to the connection pads 891 provided on the suspension 213, thus electrically connecting the PZT elements 345, 346 to the suspension traces 219 located at the side of each of the side arms 343, 344. In addition, several metal balls, for example four metal balls 225 (GBB or SBB) weld the electrical connection pads 504 of the slider 203 to the connection pads 330 of the suspension 213, thus electrically connecting the slider 203 and the suspension traces 218. Accordingly, the control system can control the slider 203 and micro-actuator 205 via the suspension traces 218, 219. When power is applied through the suspension traces 219, the PZT elements 345, 346 expand or contract, causing deformation of the two side arms 344, 345 of the U shaped micro-actuator frame, thus enabling the slider 203 moving along tracks of the disk for precisely adjusting position of the read/write head. By this manner, fine position adjustment of the slider 203 can be achieved. The suspension traces 218, 219 may be a flexible printed circuit (FPC) and may include any suitable number of lines. Particularly, the flexure 217 also includes a micro-actuator mounting plate 233 connected to the inner suspension traces 219 for mounting the micro-actuator 205 thereon. The flexure 217 has two side bars 232 formed at one end thereof adjacent the micro-actuator mounting plate 233.

Referring to FIG. 3a, the suspension tongue element 236 comprises a central portion 238 and two outer triggers 237 connected to the central portion 238 and located at both sides of the central portion 238. The independent spacer 239 is made of stiff material such as metal material and disposed between the suspension tongue element 236 and the flexure 217 to form a bigger parallel gap therebetween than that of the prior art.

Figure 4C:
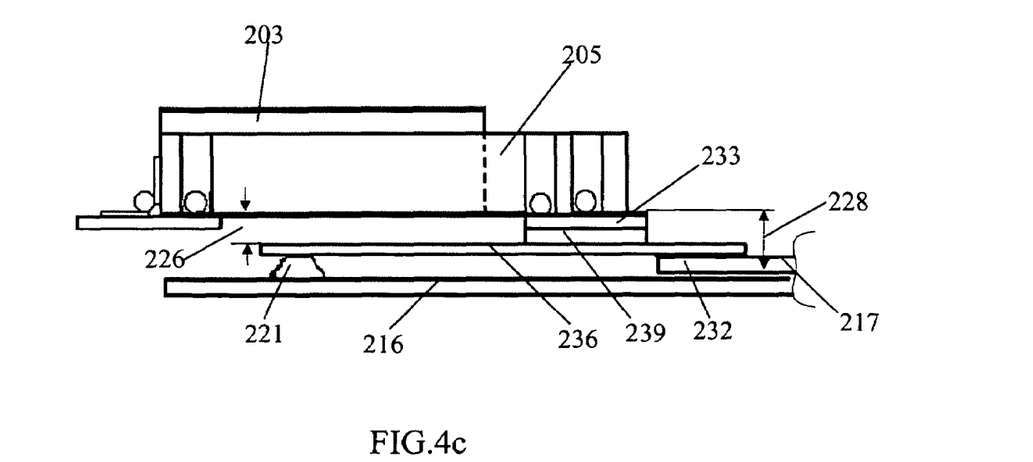

FIG. 4c illustrates a spatial connection relationship among the micro-actuator 205, the micro-actuator mounting plate 233, the independent spacer 239, the suspension tongue element 236 and the side bars 232 of the flexure 217. As illustrated, the two outer triggers 237 of the suspension tongue element 236 are laminated on the side bars 232 of the flexure 217, respectively. The method for mounting the outer triggers 237 to the side bars 232 may be welding, for example laser welding, adhesive or other suitable manner. In addition, the suspension tongue element 236 locates under the micro-actuator mounting plate 233 and supports the micro-actuator mounting plate 233 and the micro-actuator 205. Moreover, the suspension tongue element 236 engages the dimple 221 on the load beam 216. The micro-actuator 205 is mounted on the micro-actuator mounting plate 233 by epoxy or anisotropic conductive film (ACF), while the independent spacer 239 is sandwiched between the micro-actuator mounting plate 233 and the suspension tongue element 236 so as to provide a parallel gap 226 of proper height between the micro-actuator 205 and the suspension tongue element 236. The thickness of the parallel gap ranges between 35 μm and 50 μm. In an embodiment of the invention, the independent spacer 239 is disposed between the micro-actuator mounting plate 233 and the suspension tongue element 236 by welding; in another embodiment of the invention, the independent spacer 239 is disposed between the micro-actuator mounting plate 233 and the suspension tongue element 236 by adhesive.

Referring to FIGS. 3a and 4c, since the micro-actuator mounting plate 233 of the flexure 217 and the side bars 232 are parallel with each other but locate in different planes, as a result, the suspension tongue element 236 and the independent spacer 239 can be assembled together between the micro-actuator mounting plate 233 and the side bars 232. Thus, compared with the conventional HGA, the manufacturing process and the assembly process of the HGA of the invention are more convenient.

In one aspect of the invention, by providing the independent spacer 239 between the suspension tongue element 236 and the micro-actuator mounting plate 233, a parallel gap of predetermined height is formed between the micro-actuator 205 mounted on the micro-actuator mounting plate 233 and the suspension tongue element 236, thereby enabling the micro-actuator 205 and the slider 203 mounted thereon moving more freely, finally greatly improving performance characteristics of the disk drive unit; additionally, unlike the conventional technology in which the flexure and the suspension tongue element are fabricated integrally by forming a step therebetween, the independent structure design of the flexure and the suspension tongue element makes it possible to fabricate the suspension tongue element and the flexure independently from each other, thus reducing manufacturing difficulty thereof and then reducing manufacturing cost thereof.

Figure 5A:
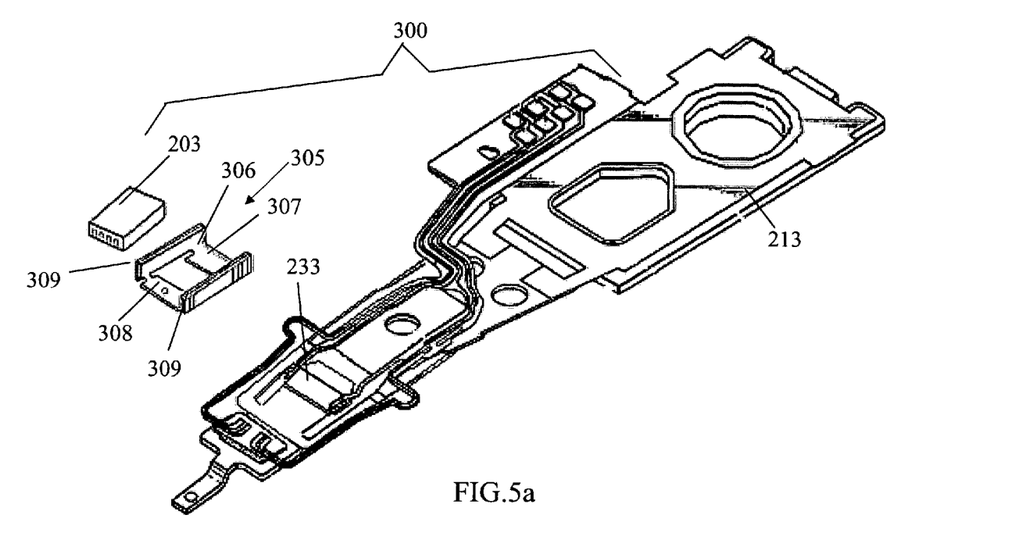
FIG. 5a is an exploded, perspective view of a HGA according to another embodiment of the invention.

Understandably, though the micro-actuator 205 is U-shaped micro-actuator in the embodiment, in other embodiments of the invention, the micro-actuator may also be other type of micro-actuator. For example, in the embodiment shown in FIG. 5a, the micro-actuator is a metal-frame micro-actuator 305, which comprises a bottom support plate 307, a top support plate 308 and a pair of side arms 306 that connects the bottom support plate 307 and the top support plate 308. Each side arm 306 has a PZT element 309 mounted thereon. The slider 203 is carried on the top support plate 308 and disposed between the two side arms 306. The micro-actuator 305 is mounted to the suspension 213 by mounting its bottom support plate 307 to the micro-actuator mounting plate 233 of the suspension 213, thus forming a HGA 300.

Figure 5B:
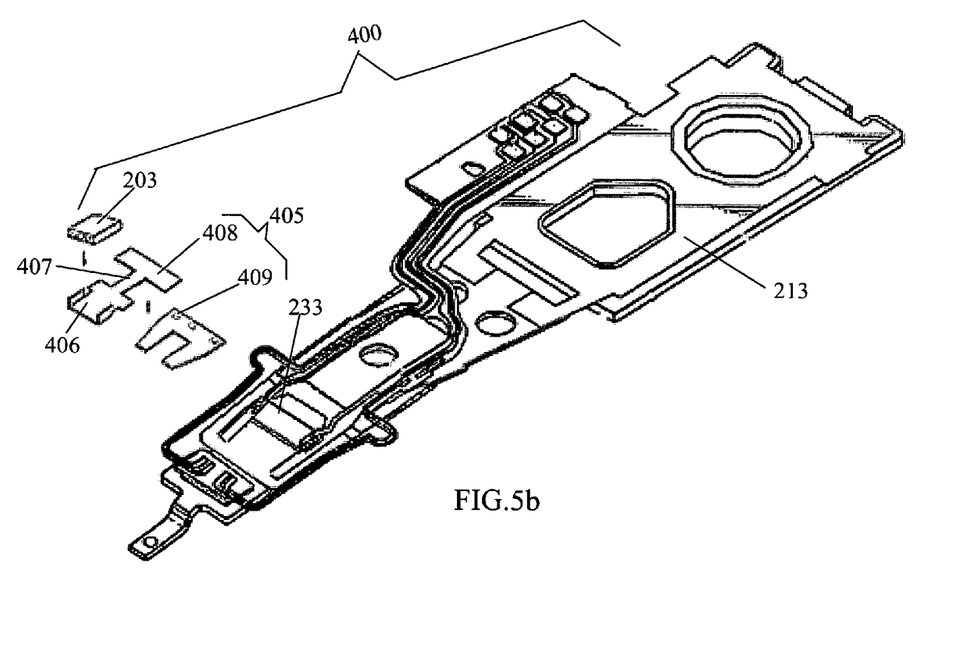
FIG. 5b is an exploded, perspective view of a HGA according to a further embodiment of the invention.

In another embodiment of the invention, as shown in FIG. 5b, the micro-actuator is a T-shaped micro-actuator 405 comprising a bottom support plate 408, a top support plate 406 and a leading beam 407 that connects the bottom support plate 408 and the top support plate 406. The PZT element 409 is disposed under the bottom support plate 408, the top support plate 406 and the leading beam 407. The micro-actuator 405 is mounted to the suspension 213 by mounting its bottom support plate 408 to the micro-actuator mounting plate 233 of the suspension 213, thus forming a HGA 400.

Figure 6:
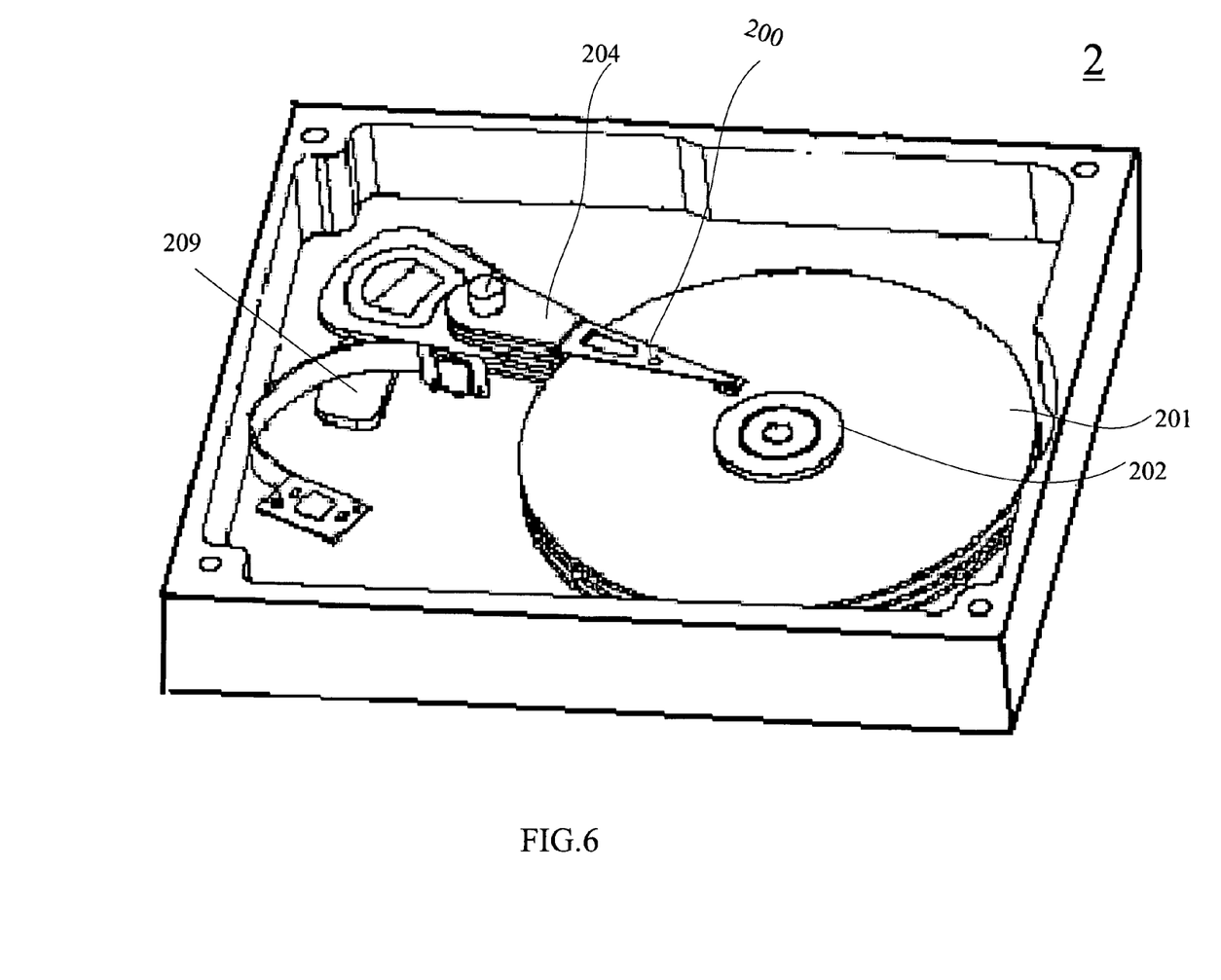
FIG. 6 is a perspective view of a disk drive unit according to an embodiment of the invention.

As shown in FIG. 6, a disk drive unit 2 according to one embodiment of the invention comprises a HGA 200, a drive arm 204 connected to the HGA 200, a disk 201, a voice coil motor (VCM) 209 and a spindle motor 202 to rotate the disk 201. Since structure/assembly of the disk drive unit of the invention is well known by ordinary person of the art, more detailed description thereof is omitted herefrom. Any disk drive unit with a suitable structure may also be applied to the invention, if only having the improved HGA of the invention.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head gimbal assembly for a disk drive unit, comprising:
   a micro-actuator;
   a slider mounted on the micro-actuator; and
   a suspension to support the micro-actuator and the slider; wherein
   the suspension comprises:
   a flexure for mounting the micro-actuator thereon;
   a suspension tongue connected with the flexure; and
   an independent spacer sandwiched between the suspension tongue and the flexure to form a parallel gap between the suspension tongue and the micro-actuator,
   wherein the flexure has two side bars and a micro-actuator mounting plate connected with the side bars, and
   wherein the independent spacer is provided between the micro-actuator mounting plate and the suspension tongue.

2. The head gimbal assembly according to claim 1, wherein the independent spacer is an independent spacer block.

3. The head gimbal assembly according to claim 1, wherein the independent spacer is made of stiff material.

4. The head gimbal assembly according to claim 3, wherein the independent spacer is made of metal material.

5. The head gimbal assembly according to claim 1, wherein the independent spacer is provided between the suspension tongue and the flexure by welding or adhesive.

6. The head gimbal assembly according to claim 1, wherein the parallel gap has a space ranging between 35 μm and 50 μm.

7. The head gimbal assembly according to claim 1, wherein the suspension tongue comprises a central portion and two outer triggers located at both sides of the central portion and connected with the central portion, and the two outer triggers are laminated on the two side bars of the flexure by welding or adhesive.

8. A disk drive unit, comprising:
- a head gimbal assembly consisting of a micro-actuator, a slider mounted on the micro-actuator and a suspension to support the micro-actuator and the slider;
- a drive arm connected to the head gimbal assembly;
- a disk; and
- a spindle motor to rotate the disk, wherein
- the suspension comprises:
- a flexure for mounting the micro-actuator thereon;
- a suspension tongue connected to the flexure; and
- an independent spacer sandwiched between the suspension tongue and the flexure to form a parallel gap between the suspension tongue and the micro-actuator,
- wherein the flexure has two side bars and a micro-actuator mounting plate connected with the side bars, and
- wherein the independent spacer is provided between the micro-actuator mounting plate and the suspension tongue.

9. The disk drive unit according to claim 8, wherein the independent spacer is an independent spacer block.

10. The disk drive unit according to claim 8, wherein the independent spacer is provided between the suspension tongue and flexure by welding or adhesive.

11. The disk drive unit according to claim 8, wherein the suspension tongue comprises a central portion and two outer triggers located at both sides of the central portion and connected with the central portion, and the two outer triggers are laminated on the two side bars of the flexure by welding or adhesive.

12. The disk drive unit according to claim 8, wherein the parallel gap has a distance of 35 μm.

* * * * *